United States Patent [19]
Daniels et al.

[11] 3,719,936
[45] March 6, 1973

[54] OIL SPILLAGE DETECTION SYSTEM

[75] Inventors: Ruthven H. Daniels, Lynnfield; Joseph G. Zahka, West Newton, both of Mass.

[73] Assignee: Durham Associates, Inc., Lynnfield, Mass.

[22] Filed: June 1, 1971

[21] Appl. No.: 148,640

[52] U.S. Cl. .................. 340/236, 325/116, 340/224
[51] Int. Cl. .............................................. G08b 21/00
[58] Field of Search ..................... 340/236, 224, 242; 137/312–314; 73/421, 308, 322.5; 324/65; 325/116

[56] References Cited

UNITED STATES PATENTS 3,428,074   2/1969   Perren ........................ 340/242 X
3,603,952   9/1971   Smith ......................... 340/236 X

*Primary Examiner*—John W. Caldwell
*Assistant Examiner*—Daniel Myer
*Attorney*—Weingarten, Maxham & Schurgin

[57] ABSTRACT

A system for the detection of oil spillage on water includes a housing adapted to be disposed in a partially submerged buoyant state in a body of water and having a selectively transmissive member for transmission of oil to a chamber which includes a sensor for detecting the presence of oil therein and for providing an output indication of oil presence.

13 Claims, 5 Drawing Figures

PATENTED MAR 6 1973 3,719,936

INVENTORS
RUTHVEN H. DANIELS
JOSEPH G. ZAHKA
BY
Weingarten, Maxham & Schurgin
ATTORNEYS

INVENTORS
RUTHVEN H. DANIELS
JOSEPH G. ZAHKA

OIL SPILLAGE DETECTION SYSTEM

FIELD OF THE INVENTION

This invention relates to selective filtration apparatus for segregating one liquid from another, and more particularly to a system for the isolation and detection of oil from water.

BACKGROUND OF THE INVENTION

Oil spillage in oceans, lakes and waterways has become a major problem and has already caused significant damage, both esthetic and ecologic, to regions of the United States and indeed many areas of the entire world. Spillage of oil has been caused by accidents involving oil tankers and underwater oil drilling operations, as well as by inattention such as the overfilling of tanks and other storage vessels on or near bodies of water. Detection of an oil spillage has thus far been accomplished by human observation and usually on a happenstance basis, with the result that often disastrous damage has been done before corrective measures can be taken. The early detection of spilled oil would contribute greatly to solution of the spillage problem as prompt measures could then be taken to isolate and recover the oil before damage resulted. It would be desirable to have and it is an object of the present invention to provide an automatic detection system which can be deployed at unattended sites in the ocean and other bodies of water for signaling the presence of oil at the detection site.

SUMMARY OF THE INVENTION

In accordance with the present invention, an oil spillage detection system is provided which is of relatively simple and yet extremely reliable construction and which can provide unattended and prompt detection of the presence of oil on a body of water and an output indication of such oil presence. Briefly, the invention includes a housing adapted to be disposed in a partially submerged buoyant state in a body of water and having one or more input ports to permit entry of water and any oil which may be on the surface thereof. A selectively transmissive member is provided within the housing in a position exposed to the oil-water interface, and is operative to only transmit oil therethrough. Oil is transmitted through the member to a chamber within the housing which includes a sensor for detecting the presence of oil therein and for providing an output indication of oil presence. The selectively transmissive member is typically a selectively permeable membrane or a capillary tube structure which permits the transmission of oil to a sensing position to the exclusion of water.

The sensor may take the form of a resistance temperature dependent (RTD) electrical thermometer, the characteristics of which provide a sensible resistance change in the presence of surrounding liquid. Alternatively, the sensor can be mechanically actuable by the weight of oil within the chamber for causing an output indication. The oil chamber can be removable from the detection system to permit collection of oil samples, such as for analysis to determine the source of the contaminant, and a plurality of chambers can also be provided to permit the sequential collection of a number of oil samples over a period of time. As a further feature of the invention, the system can also include means for releasing, upon detection of oil spillage, a coalescing agent which combines with the oil to provide a composition more easily recovered from the water surface. The coalescent can be of a form to permit the reclamation of oil from the recovered composition without contamination of the oil. A marking material can also be released to visually mark the spillage site.

DESCRIPTION OF THE DRAWINGS

The invention will be more fully understood from the following detailed description taken in conjunction with the accompanying drawings, in which.

DETAILED DESCRIPTION OF THE INVENTION

Figure 1:
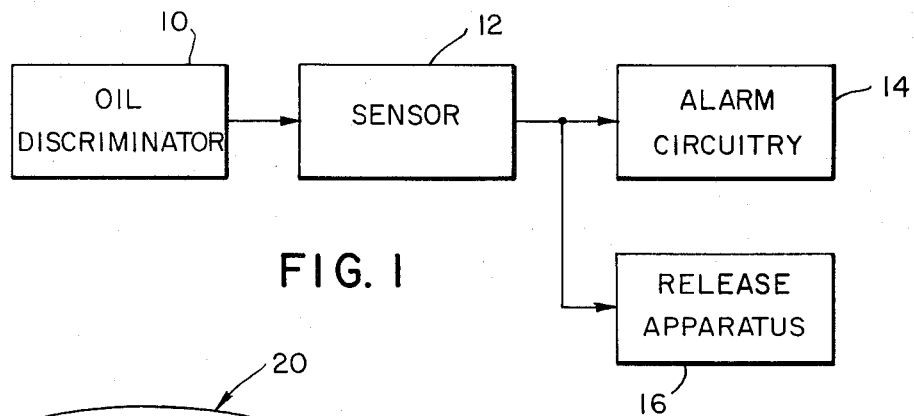
FIG. 1 is a block diagram of an oil spillage detection system according to the invention.

The invention is illustrated in block diagram form in FIG. 1 and includes an oil discriminator 10, the output of which is coupled to a sensor 12 which provides an output signal to alarm circuitry 14 and which may also provide an output signal to apparatus 16 to cause release of a marking or a coalescing agent. The discriminator 10 is contained within a housing which is adapted to be partially submerged within a body of water and to permit exposure of the water surface to the discriminator. The discriminator includes a selective member which may be for example a selectively permeable membrane, capillary tube or adsorption filter which substantially rejects the transmission of water but which provides for the transmission of oil therethrough and into a chamber which includes the sensor 12.

Upon detection by sensor 12 of the presence of oil within the sensing chamber, an output signal is provided to alarm circuitry 14 and to apparatus 16 for release of a coalescent which combines with the oil to permit its expeditious recovery from the water. The apparatus 16 can also provide for release of a suitable marking material to visually mark the site of the oil spill. The alarm circuitry 14 can provide a local or remote indication of oil detection to suit particular requirements. The output indication can be an audible and/or visual alarm locally actuated at the sensing site or remotely actuable via a suitable communications link such as cable or radio. An array of sensing systems can be deployed in a given area to achieve large area detection, and the sensor output signals can be multiplexed onto a single carrier signal for transmission to a receiving site.

Figure 2:
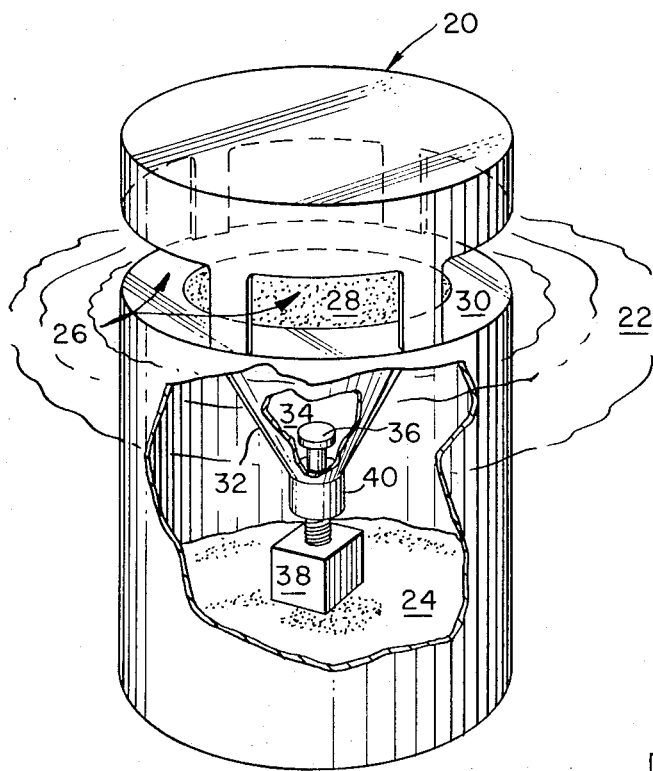
FIG. 2 is a cutaway pictorial view of one embodiment of the invention.

The invention in a typical embodiment is illustrated in FIG. 2 and includes a generally cylindrical housing 20 adapted to be maintained in a partially submerged buoyant state in a body of water 22. Ballast material 24 can be provided in the bottom of housing 20 to provide the intended degree of buoyancy. A plurality of openings 26 are provided around the circumferential surface of housing 20 in a position confronting the water surface to permit the entrance of water and oil which may be contained on the surface thereof. A selectively permeable membrane 18 is disposed within housing 20 by means of an annular ring 30 secured to the inside cylindrical surface of housing 20 in a position as illustrated to permit its exposure to the surface of the body of water 12. A cup-shaped member 32 is secured to and depends from ring 30 to define a chamber 34 for collection of oil transmitted by membrane 28. A sensor 36 is provided in the lower portion of member 32 for sensing the presence of oil within the chamber 34. Sensor 36 is connected to circuitry disposed within enclosure 38 and operative to provide an output indication of oil presence. The sensor can be vertically adjusted by means of collar 40 to varying heights in chamber 34 to provide actuation upon the presence of a predetermined quantity of oil, as will be described. In some instances, it may be desirable to provide a member 32 which is readily removable such that samples of detected oil can be collected from the system, with a new member 32 installed in housing 20 for subsequent detection.

The membrane 28 is of the hydrophobic lipophylic type which rejects the transmission of water but provides for the transmission of oil therethrough. These membranes are per se well known and can be constructed with a predetermined pore radius to produce an intended rate of oil transmission for material of selected surface tension characteristics. As housing 20 floats in the body of water 22 it will tend to roll from side to side due to water motion, permitting the entrance of water and any oil on the surface thereof into ports 26. Oil will be readily transmitted through membrane 28 and collected within chamber 34, the presence of oil surrounding sensor 36 causing actuation of associated circuitry to provide an output indication of oil presence.

The sensor 36 is typically a resistance temperature dependent (RTD) electrical thermometer and preferably is of the positive temperature coefficient type operating in a heated mode to provide a large change in current when the element is cooled. In the present instance, oil is a much better thermal conductor than air, such that when oil is introduced within chamber 34 and surrounds sensor 36, a significant current change results which can be employed to energize appropriate utilization circuitry. Only a small quantity of oil is required to provide the intended signal indication, and it is generally sufficient to cover sensor 36 with only a thin layer of oil to provide detection. The sensor can be adjusted within chamber 34 to permit collection of a predetermined quantity of oil before detection to prevent sensor actuation by small amounts of oil which may ordinarily be present in a particular operating environment.

Figure 3:
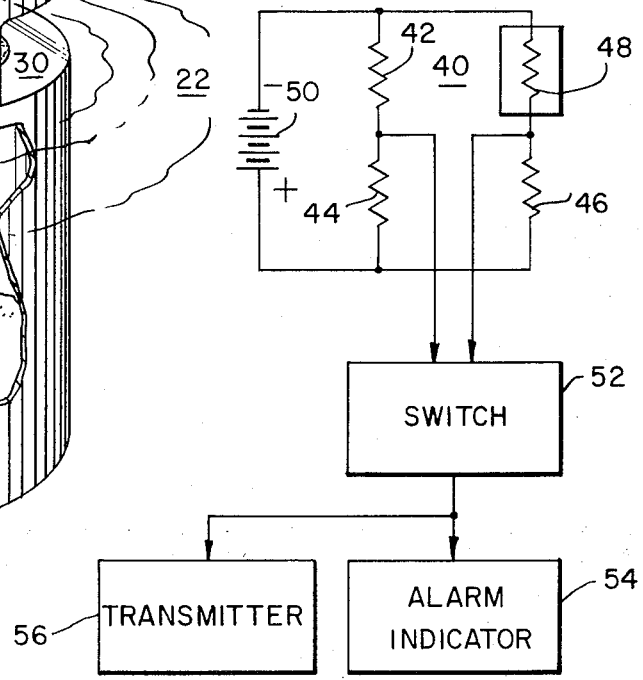
FIG. 3 is a diagrammatic representation of circuitry useful in the invention.

The sensor 36 can be employed as part of a bridge circuit 40, shown in FIG. 3, which, in the absence of a sensible amount of oil within the chamber 34, remains in a quiescent state to provide no output signal. When, however, a sensible quantity of oil is transmitted into chamber 34 and onto sensor 36, the change in thermal conductivity experienced by the sensor by reason of the higher thermal conductivity of the oil, provides a sufficient resistance change within the bridge circuit to provide a relatively large change in current which unbalances the bridge and causes an output indication. Referring to FIG. 3, bridge 40 is composed of resistors 42, 44, 46 and 48, the last named resistor being the sensor 36. The bridge is powered by an energy source such as a battery 50, and the output thereof is coupled to a switch 52, typically an electronic switching element or network. Switch 52 provides an output signal to a local alarm indicator 54, and/or to a transmitter 56 for communication of an alarm indication to a remote receiving station. The output signal from switch 52 can also, as described above, trigger the release of a coalescing agent to aid in oil recovery or of a marking material to visually note the oil spillage area.

Figure 4:
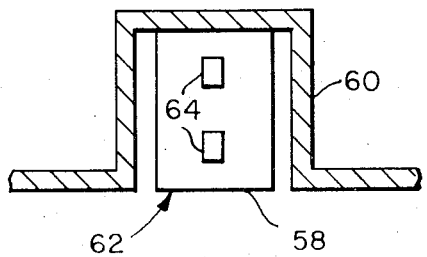
FIG. 4 is an elevation view partly in section of an alternative embodiment of the invention.

An alternative embodiment of the invention is illustrated in FIG. 4 wherein a hydrophobic lipophylic adsorption probe 58 of cylindrical configuration is suspended within a housing 60 such that the lower active surface 62 of the probe is in contact with the surface of water. If oil is present, the oil will be drawn by capillary action up the vertical surface of the probe and come in contact with the sensors 64 attached to or embedded in the probe surface. Two sensors are employed in this embodiment to indicate, in addition to oil presence, the rate of oil capture by measurement of the time between detection by respective sensors 64. The diameter of probe 58 can be selected to provide a narrow vertical path for capillary support action to enhance the capillary action occurring on the surface of the probe. This construction is useful to preclude the admittance of splashed water which could contact the sensors 64 and cause false actuation. To further reduce the possibility of admittance of water onto the sensors, a hydrophobic material can be employed to coat the inside surfaces of housing 60 in the region of probe 58.

It will be appreciated that the invention can be embodied in a variety of buoyant structures and that the selectively transmissive member can be of varying configurations depending upon the particular water enrivonment in which such housing is to be deployed. As an alternative to the selectively permeable membrane described hereinabove, a capillary tube structure can be employed to siphon oil from the water surface and direct it to a sensing position. By use of such capillary tubes a labyrinthine discriminator construction can be provided which is useful for example in high sea states to prevent the entrance of water into the sensing chamber. The capillary tube structure can be employed in conjunction with a selective membrane for multistage operation, and a series of oil detection reservoirs can be provided for collection of a succession of oil samples, useful to indicate the rate of oil collection which can provide a measure of the magnitude of an oil spill. A sequence of detection chambers can also be provided according to the invention with a different selective member associated with each chamber to separate different constitutents of an oil spill.

Figure 5:
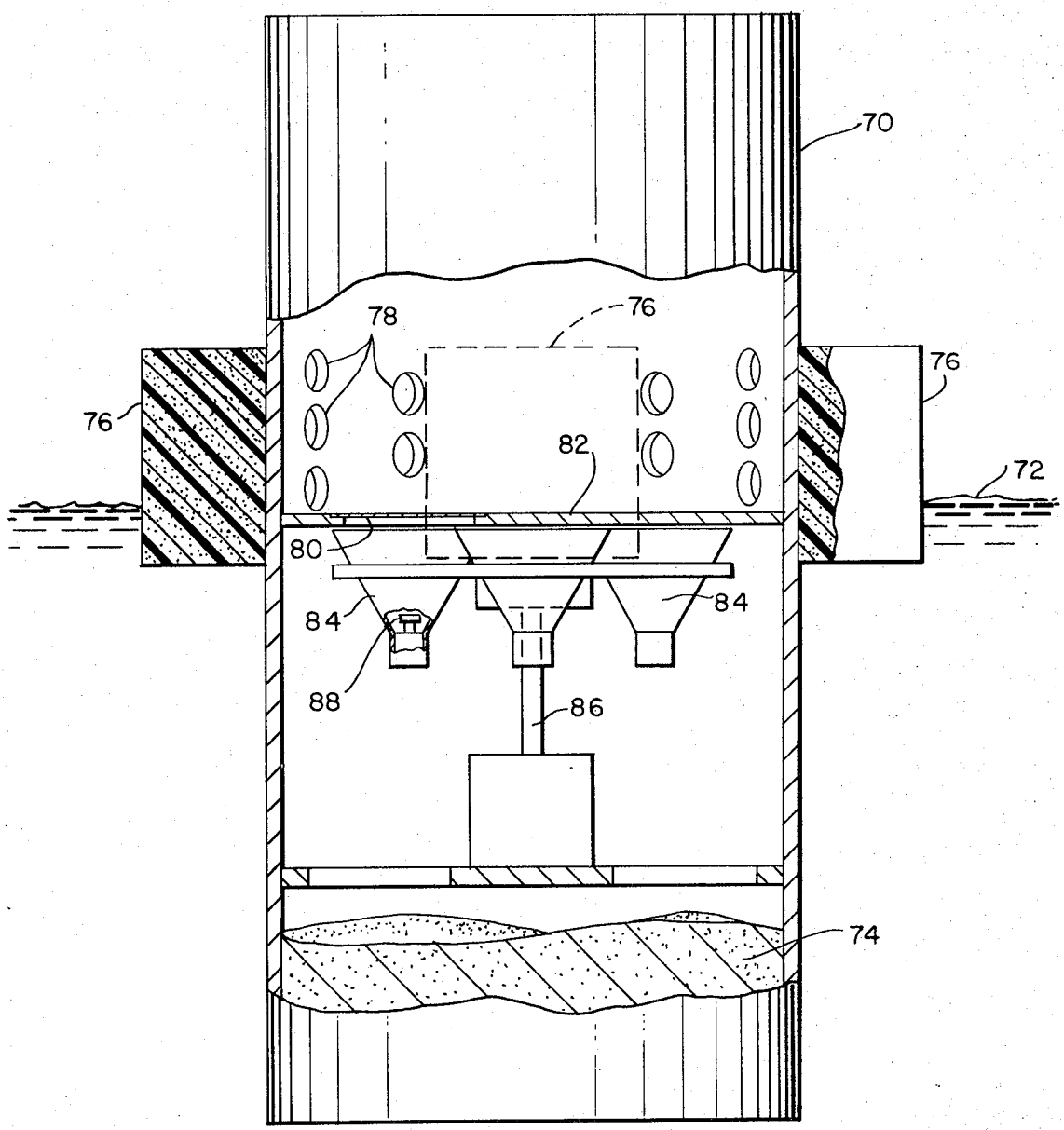
FIG. 5 is a cutaway pictorial view of a further embodiment of the invention.

An alternative embodiment of the invention is depicted in FIG. 5 wherein a plurality of chambers are provided for sequential collection and detection of oil spillage. Referring to FIG. 5, there is shown a generally cylindrical housing 70 constructed to be disposed in a partially submerged buoyant state in a body of water, the nominal water surface being depicted by line 72. Ballast material 74 can be provided in the bottom of housing 70 to provide the intended degree of buoyancy with respect to the water surface. A plurality of flotation bumpers 76 can be provided about the periphery of housing 70 at the water level to aid in maintaining the disposition of housing 70 in its partially submerged state and to minimize rolling of the housing with water movement. The wall of housing 70 between bumpers 76 in a band confronting the water surface 72 has perforations 78 to permit the entrance of water and oil on the surface thereof. A hydrophobic lipophylic membrane 80 is supported as illustrated within an opening provided in a plate 82.

A plurality of receptacles 84 are arranged on a turret assembly 86, each chamber being rotatably moveable into alignment with membrane 80 to receive oil transmitted therethrough. A sensor 88, such as the resistance temperature dependent element described above, is provided in the bottom of each receptacle 84 to provide an output indication of oil presence. The sensors 88 are each connected to utilization circuitry (not shown) which can be located in any convenient position within housing 70. It will be appreciated that the utilization circuitry can be constructed utilizing miniature electronic circuit techniques and thus requires very little space within the housing. Heavier circuit components such as a battery source can be disposed near the bottom of housing 70 to also serve as ballast.

The operation of the oil spillage detection system is as described above. In the present embodiment, however, upon detection of oil by one of the sensors 88, the turret assembly 86 causes rotation of the receptacles 84 to align an unused receptacle with membrane 80. The turret can be sequenced in like manner each time the operative sensor 88 denotes oil detection. The relative timing of the signals provided by respectively energized sensors 88 provides a measure of the rate of oil collection, which can be representative of the magnitude of the oil spill being detected.

While the invention is especially suited to detection of oil on a water surface, it will be appreciated that the invention is also useful to detect the presence of emulsified oil in water and the presence of other liquid contaminants. For use with other contaminants, the selectively transmissive member employed in a particular instance would of course be such to transmit the desired contaminant to be detected to a position at which this contaminant is sensed.

Although typical embodiments of the invention have been shown and described it is evident that various modifications and alternative implementations will now occur to those versed in the art. For example, the buoyant housing can be of a size, material and configuration to suit the water environment in which it is disposed. In some instances it may be desirable to incorporate the sensing system on or within marine buoys of known construction. In addition, the specific sensing element for detecting oil presence and the circuitry energized by such a sensing element can be of many different forms to suit particular operating requirements. Accordingly, it is not intended to limit the invention by what has been particularly shown and described except as indicated in the appended claims.

What is claimed is:

1. An oil spillage detection system comprising:
   a housing adapted to be disposed in a partially submerged buoyant state in a body of water;
   a selectively transmissive member of the hydrophobic lipophylic type exposed to the surface of said body of water and operative to transmit oil contained on the surface of said body of water to a sensing position; and
   sensing means disposed with respect to said member at said sensing position and operative in response to the presence of oil transmitted by said member to provide an output indication of oil presence.

2. An oil spillage detection system according to claim 1 wherein said selectively transmissive member includes an adsorption element having a surface exposed to the surface of said body of water and operative to transmit oil on said water surface to a sensing position on said element.

3. An oil spillage detection system according to claim 1 wherein said sensing means includes a resistance temperature dependent element which exhibits a sensible change of resistance in the presence of surrounding oil to provide said output indication of oil presence.

4. An oil spillage detection system comprising:
   a housing adapted to be disposed in a partially submerged buoyant state in a body of water;
   a chamber disposed within said housing for collection of a predetermined quantity of oil;
   a selectively transmissive member of the hydrophobic lipophylic type supported by said housing and exposed to the surface of said body of water and operative to transmit oil contained on said water surface to said chamber; and
   sensing means disposed within said chamber and operative in response to the presence of oil transmitted into said chamber by said member to provide an output indication of oil presence.

5. An oil spillage detection system according to claim 4 including:
   means operative in response to said output indication of oil presence to release a material onto said oil spillage.

6. An oil spillage detection system according to claim 4 including:
   means operative in response to said output indication to signal at a remote site detection of oil presence.

7. An oil spillage detection system according to claim 4 including:
   means operative in response to said output indication of oil presence to release a marking material onto said oil spillage for visual notation of the spillage area.

8. An oil spillage detection system according to claim 4 including:
   means operative in response to said output indication of oil presence to release a coalescing material onto said oil spillage to aid in oil recovery.

9. An oil spillage detection system according to claim 4 wherein said sensing means includes an electrical element which exhibits a sensible change in operating characteristics in the presence of surrounding oil.

10. An oil spillage detection system according to claim 4 wherein said chamber is one of a plurality of oil receiving chambers;
   and including means for sequentially positioning said plurality of oil receiving chambers in operative relation with said selectively transmissive member to provide for the sequential collection of oil samples.

11. A detection system for a contaminant disposed on the surface of a body of water comprising:
- a housing adapted to be disposed in a partially submerged buoyant state in a body of water;
- a selectively transmissive member adapted to transmit said contaminant to the exclusion of water, said member being exposed to the surface of said body of water and operative to transmit the contaminant on the surface of said body of water to a sensing position; and
- sensing means disposed with respect to said member at said sensing position an operative in response to the presence of said contaminant transmitted by said member to provide an output indication of contaminant presence.

12. An oil spillage detection system comprising:
- a housing adapted to be disposed in a partially submerged buoyant state in a body of water;
- a selectively transmissive membrane adapted to transmit oil to the exclusion of water, said membrane being exposed to the surface of said body of water and operative to transmit oil contained on the surface of said body of water to a sensing position; and
- sensing means disposed with respect to said membrane at said sensing position and operative in response to the presence of oil transmitted by said membrane to provide an output indication of oil presence.

13. An oil spillage detection system according to claim 12 including a chamber disposed within said housing for collecting a quantity of oil transmitted by said selectively transmissive membrane.

* * * * *